(12) United States Patent
Lee et al.

(10) Patent No.: US 10,470,097 B2
(45) Date of Patent: Nov. 5, 2019

(54) METHOD FOR PERFORMING A HANDOVER PROCEDURE IN A COMMUNICATION SYSTEM AND DEVICE THEREFOR

(71) Applicant: LG ELECTRONICS INC., Seoul (KR)

(72) Inventors: Jaewook Lee, Seoul (KR); Youngdae Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/645,856

(22) Filed: Jul. 10, 2017

(65) Prior Publication Data

US 2018/0014238 A1 Jan. 11, 2018

Related U.S. Application Data

(60) Provisional application No. 62/360,478, filed on Jul. 11, 2016, provisional application No. 62/361,522, filed on Jul. 13, 2016.

(51) Int. Cl.
*H04W 36/30* (2009.01)
*H04W 36/00* (2009.01)
*H04W 76/23* (2018.01)

(52) U.S. Cl.
CPC ....... *H04W 36/30* (2013.01); *H04W 36/0055* (2013.01); *H04W 36/03* (2018.08); *H04W 76/23* (2018.02); *H04W 36/0009* (2018.08); *H04W 36/0058* (2018.08)

(58) Field of Classification Search
CPC .................................................. H04W 36/30
USPC .............................. 455/436–448, 7–25, 519
See application file for complete search history.

(56) References Cited

U.S. PATENT DOCUMENTS

| | | | | |
|---|---|---|---|---|
| 8,559,957 B2* | 10/2013 | Hunzinger | ........ | H04W 36/0083 370/315 |
| 2004/0192204 A1* | 9/2004 | Periyalwar | ............ | H04B 7/155 455/25 |
| 2008/0214182 A1* | 9/2008 | Wang | .................. | H04B 7/2606 455/423 |
| 2012/0282932 A1* | 11/2012 | Yu | ...................... | H04W 84/005 455/437 |
| 2015/0181502 A1* | 6/2015 | Hans | .................... | H04W 40/22 455/437 |

* cited by examiner

*Primary Examiner* — Joel Ajayi
(74) *Attorney, Agent, or Firm* — Lee, Hong, Degerman, Kang & Waimey (57) ABSTRACT

The present invention relates to a wireless communication system. More specifically, the present invention relates to a method for performing, by a first user equipment (UE) connected with one or more UEs, a handover procedure in a wireless communication system, the method comprising: transmitting, to a serving cell, first information including a channel quality between the first UE and the one or more UEs based on a predetermined configuration; receiving, from the serving cell, second information indicating a second UE to perform a handover procedure with the first UE among the one or more UEs in response to the first information; and performing the handover procedure with the second UE indicated to perform the handover procedure by the second information.

4 Claims, 8 Drawing Sheets

(a) Control-Plane Protocol Stack (b) User-Plane Protocol Stack

METHOD FOR PERFORMING A HANDOVER PROCEDURE IN A COMMUNICATION SYSTEM AND DEVICE THEREFOR

Pursuant to 35 U.S.C. § 119(e), this application claims the benefit of U.S. Provisional Patent Application Nos. 62/360,478, filed on Jul. 11, 2016 and 62/361,522 filed on Jul. 13, 2016, the contents of which are hereby incorporated by reference herein in their entirety.

BACKGROUND OF THE INVENTION

Field of the Invention

The present invention relates to a wireless communication system and, more particularly, to a method for performing a handover procedure in a communication system and a device therefor.

Discussion of the Related Art

As an example of a mobile communication system to which the present invention is applicable, a 3rd Generation Partnership Project Long Term Evolution (hereinafter, referred to as LTE) communication system is described in brief.

Figure 1:
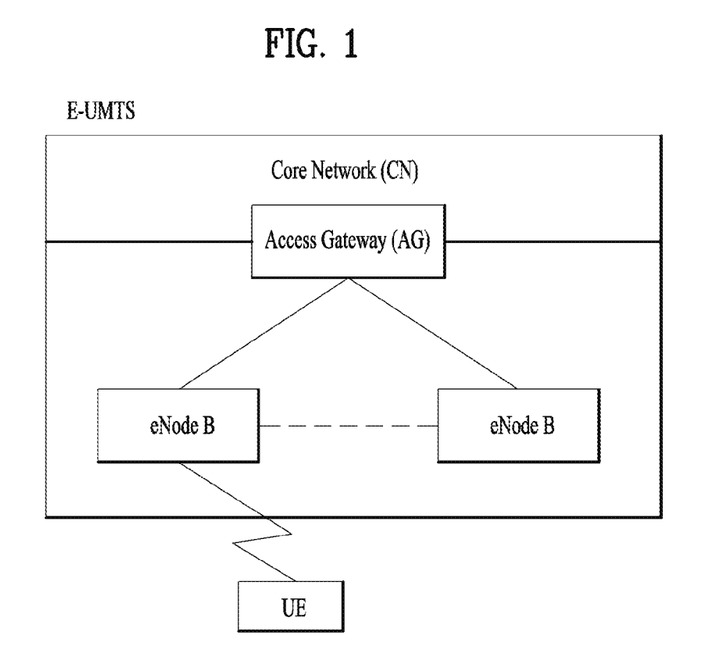
FIG. 1 is a diagram showing a network structure of an Evolved Universal Mobile Telecommunications System (E-UMTS) as an example of a wireless communication system.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

SUMMARY OF THE INVENTION

The object of the present invention can be achieved by providing a method for performing, by a first user equipment (UE) connected with one or more UEs, a handover procedure in a wireless communication system, the method comprising: transmitting, to a serving cell, first information including a channel quality between the first UE and the one or more UEs based on a predetermined configuration; receiving, from the serving cell, second information indicating a second UE to perform a handover procedure with the first UE among the one or more UEs in response to the first information; and performing the handover procedure with the second UE indicated to perform the handover procedure by the second information.

In another aspect of the present invention provided herein is A first user equipment (UE) connected with one or more UEs in a wireless communication system, the first UE comprising: a radio frequency (RF) module; and a processor connected with the RF module, wherein the processor is configured to: control the RF module to transmit, to a serving cell, first information including a channel quality between the first UE and the one or more UEs based on a predetermined configuration, control the RF module to receive, from the serving cell, second information indicating a second UE to perform a handover procedure with the first UE among the one or more UEs in response to the first information, and perform the handover procedure with the second UE indicated to perform the handover procedure by the second information.

Preferably, the method further comprises releasing a connection between the first UE and another UE not indicated by the second information among the one or more UEs.

Preferably, the predetermined configuration includes an indication indicating whether to report the first information with a measurement report for a channel between the first UE and at least one of a serving cell and a neighboring cell when the first UE transmits the measurement report to the serving cell.

Preferably, if the indication is configured to a predetermined measurement event, the first UE reports the first information when the predetermined measurement event is satisfied based on channel between the first UE and at least one of the serving cell and the neighboring cell.

Preferably, the method further comprises receiving third information including the channel quality from each of the one or more UEs.

Preferably, the third information further includes a measurement report for a channel for at least one of a serving cell and a neighboring cell of each of the one or more UEs.

Preferably, a measurement for the channel for at least one of the serving cell and the neighboring cell of each of the one or more UEs is activated or deactivated based on the channel quality between the first UE and each of the one or more UEs.

Preferably, when the channel quality is less than a predetermined threshold, the measurement is activated.

Preferably, the one or more UEs are radio resource control (RRC) connected UEs.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

FIG. 8 is a block diagram of a communication apparatus according to an embodiment of the present invention.

DETAILED DESCRIPTION OF THE INVENTION

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 2A:
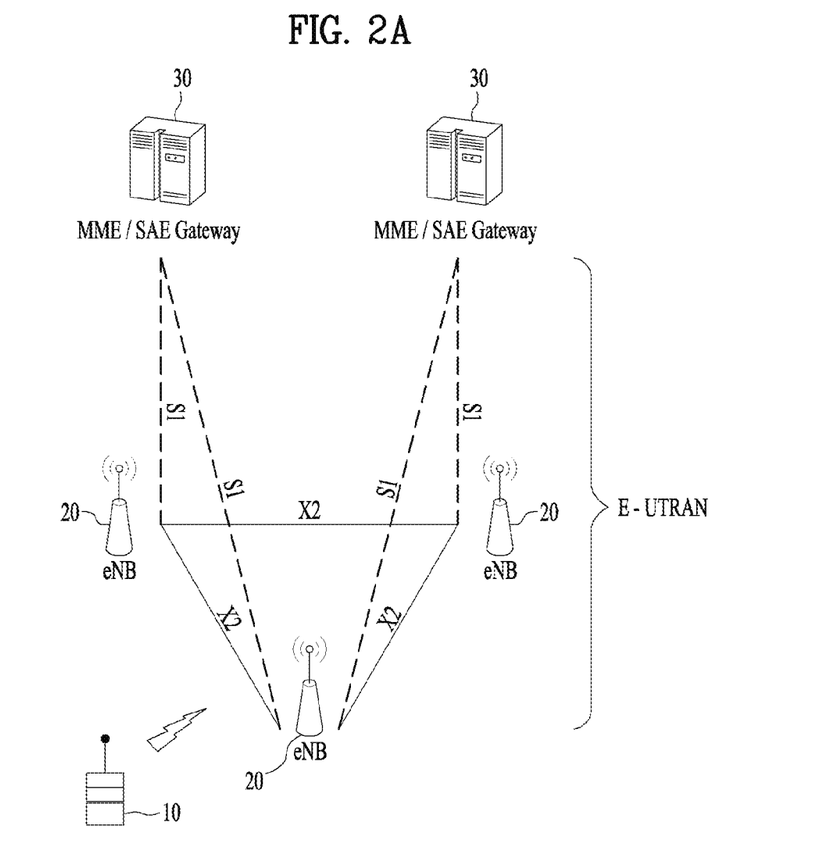
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
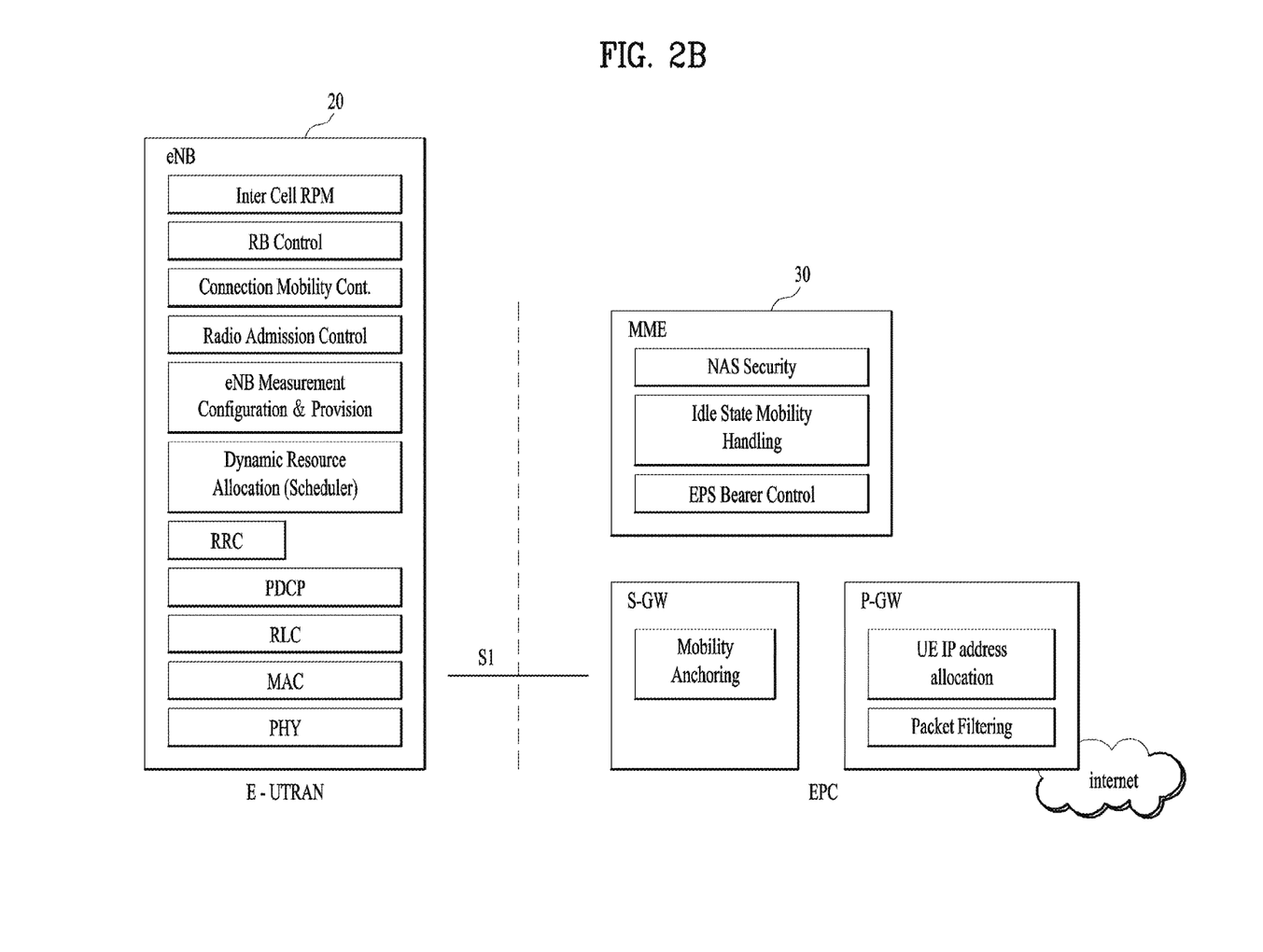
FIG. 2B is a block diagram depicting architecture of a typical E-UTRAN and a typical EPC.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
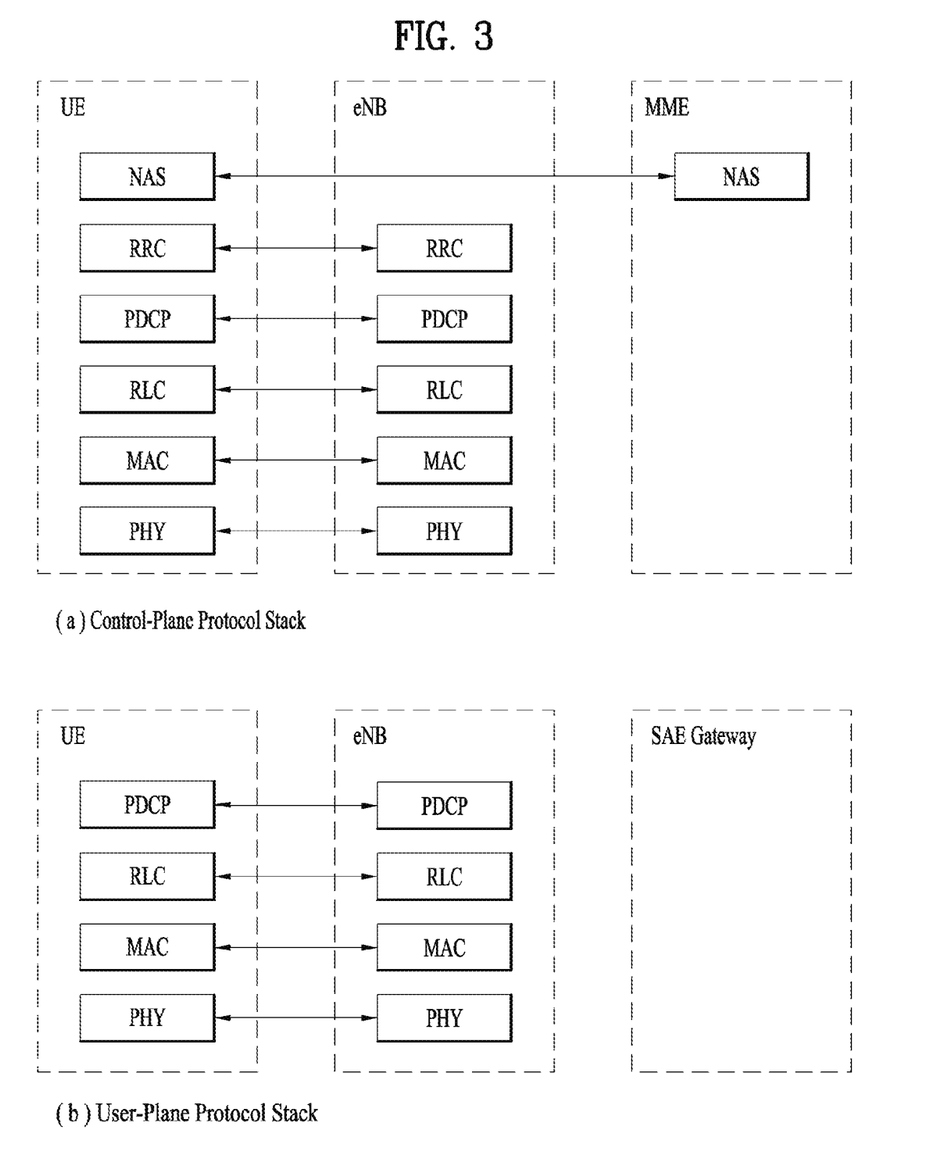
FIG. 3 is a diagram showing a control plane and a user plane of a radio interface protocol between a UE and an E-UTRAN based on a 3rd generation partnership project (3GPP) radio access network standard.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
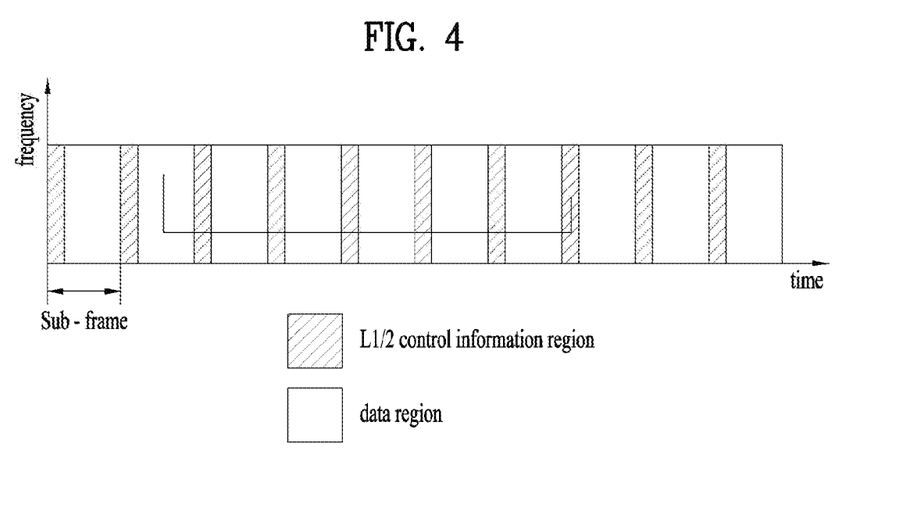
FIG. 4 is a diagram of an example physical channel structure used in an E-UMTS system.

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 5:
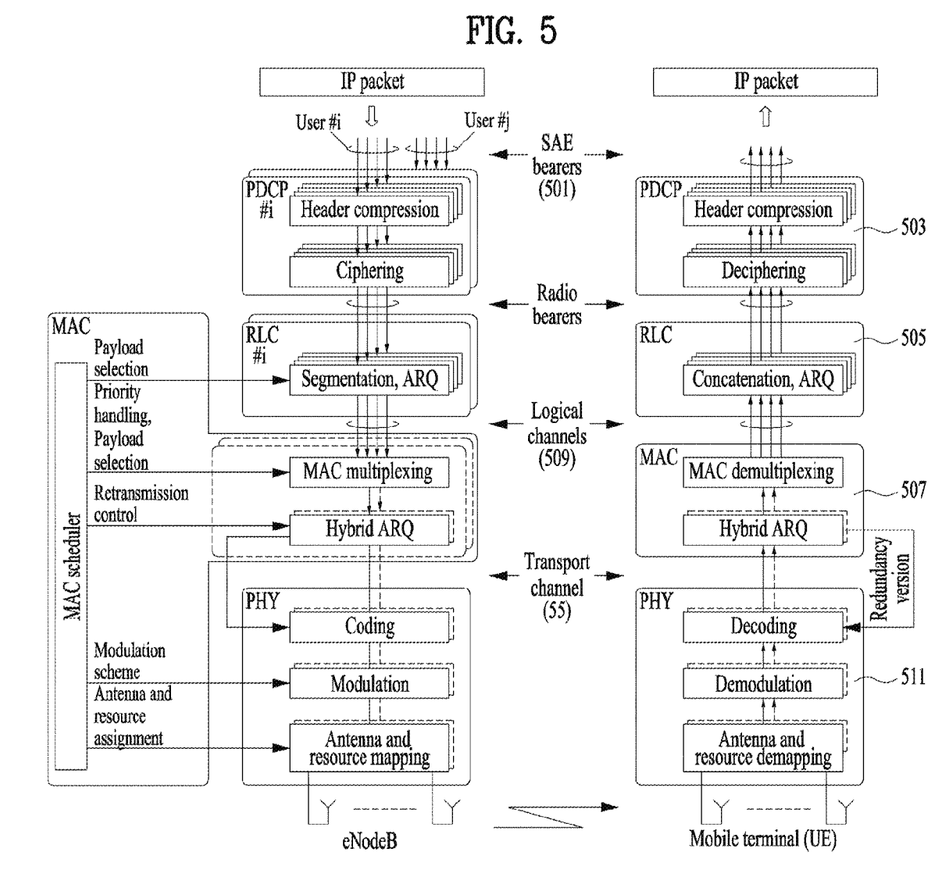
FIG. 5 is a diagram for a general overview of the LTE protocol architecture for the downlink.

FIG. 5 is a diagram for a general overview of the LTE protocol architecture for the downlink.

A general overview of the LTE protocol architecture for the downlink is illustrated in FIG. 5. Furthermore, the LTE protocol structure related to uplink transmissions is similar to the downlink structure in FIG. 5, although there are differences with respect to transport format selection and multi-antenna transmission.

Data to be transmitted in the downlink enters in the form of IP packets on one of the SAE bearers (501). Prior to transmission over the radio interface, incoming IP packets are passed through multiple protocol entities, summarized below and described in more detail in the following sections:

Packet Data Convergence Protocol (PDCP, 503) performs IP header compression to reduce the number of bits necessary to transmit over the radio interface. The header-compression mechanism is based on ROHC, a standardized header-compression algorithm used in WCDMA as well as several other mobile-communication standards. PDCP (503) is also responsible for ciphering and integrity protection of the transmitted data. At the receiver side, the PDCP protocol performs the corresponding deciphering and decompression operations. There is one PDCP entity per radio bearer configured for a mobile terminal.

Radio Link Control (RLC, 505) is responsible for segmentation/concatenation, retransmission handling, and in-sequence delivery to higher layers. Unlike WCDMA, the RLC protocol is located in the eNodeB since there is only a single type of node in the LTE radio-access-network architecture. The RLC (505) offers services to the PDCP (503) in the form of radio bearers. There is one RLC entity per radio bearer configured for a terminal.

There is one RLC entity per logical channel configured for a terminal, where each RLC entity is responsible for: i) segmentation, concatenation, and reassembly of RLC SDUs; ii) RLC retransmission; and iii) in-sequence delivery and duplicate detection for the corresponding logical channel.

Other noteworthy features of the RLC are: (1) the handling of varying PDU sizes; and (2) the possibility for close interaction between the hybrid-ARQ and RLC protocols. Finally, the fact that there is one RLC entity per logical channel and one hybrid-ARQ entity per component carrier implies that one RLC entity may interact with multiple hybrid-ARQ entities in the case of carrier aggregation.

The purpose of the segmentation and concatenation mechanism is to generate RLC PDUs of appropriate size from the incoming RLC SDUs. One possibility would be to define a fixed PDU size, a size that would result in a compromise. If the size were too large, it would not be possible to support the lowest data rates. Also, excessive padding would be required in some scenarios. A single small PDU size, however, would result in a high overhead from the header included with each PDU. To avoid these drawbacks, which is especially important given the very large dynamic range of data rates supported by LTE, the RLC PDU size varies dynamically.

In process of segmentation and concatenation of RLC SDUs into RLC PDUs, a header includes, among other fields, a sequence number, which is used by the reordering and retransmission mechanisms. The reassembly function at the receiver side performs the reverse operation to reassemble the SDUs from the received PDUs.

Medium Access Control (MAC, 507) handles hybrid-ARQ retransmissions and uplink and downlink scheduling. The scheduling functionality is located in the eNodeB, which has one MAC entity per cell, for both uplink and downlink. The hybrid-ARQ protocol part is present in both the transmitting and receiving end of the MAC protocol. The MAC (507) offers services to the RLC (505) in the form of logical channels (509).

Physical Layer (PHY, 511), handles coding/decoding, modulation/demodulation, multi-antenna mapping, and other typical physical layer functions. The physical layer (511) offers services to the MAC layer (507) in the form of transport channels (513).

The Logical Channel Prioritization procedure is applied when a new transmission is performed.

RRC controls the scheduling of uplink data by signalling for each logical channel: priority where an increasing priority value indicates a lower priority level, prioritisedBitRate which sets the Prioritized Bit Rate (PBR), bucketSizeDuration which sets the Bucket Size Duration (BSD).

The MAC entity shall maintain a variable Bj for each logical channel j. Bj shall be initialized to zero when the related logical channel is established, and incremented by the product PBR×TTI duration for each TTI, where PBR is Prioritized Bit Rate of logical channel j. However, the value of Bj can never exceed the bucket size and if the value of Bj is larger than the bucket size of logical channel j, it shall be set to the bucket size. The bucket size of a logical channel is equal to PBR×BSD, where PBR and BSD are configured by upper layers.

The MAC entity shall perform the following Logical Channel Prioritization procedure when a new transmission is performed. The MAC entity shall allocate resources to the logical channels in the following steps.

Step 1: All the logical channels with Bj>0 are allocated resources in a decreasing priority order. If the PBR of a logical channel is set to "infinity", the MAC entity shall allocate resources for all the data that is available for transmission on the logical channel before meeting the PBR of the lower priority logical channels.

Step 2: the MAC entity shall decrement Bj by the total size of MAC SDUs served to logical channel j in Step 1.

Step 3: if any resources remain, all the logical channels are served in a strict decreasing priority order (regardless of the value of Bj) until either the data for that logical channel or the UL grant is exhausted, whichever comes first. Logical channels configured with equal priority should be served equally.

The UE shall also follow the rules below during the scheduling procedures above.

The UE should not segment an RLC SDU (or partially transmitted SDU or retransmitted RLC PDU) if the whole SDU (or partially transmitted SDU or retransmitted RLC PDU) fits into the remaining resources of the associated MAC entity.

If the UE segments an RLC SDU from the logical channel, it shall maximize the size of the segment to fill the grant of the associated MAC entity as much as possible.

The UE should maximize the transmission of data.

if the MAC entity is given an UL grant size that is equal to or larger than 4 bytes while having data available for transmission, the MAC entity shall not transmit only padding BSR and/or padding (unless the UL grant size is less than 7 bytes and an AMD PDU segment needs to be transmitted).

The MAC entity shall not transmit data for a logical channel corresponding to a radio bearer that is suspended.

For the Logical Channel Prioritization procedure, the MAC entity shall take into account the following relative priority in decreasing order.

MAC control element for C-RNTI or data from UL-CCCH;

MAC control element for BSR, with exception of BSR included for padding;

MAC control element for PHR, Extended PHR, or Dual Connectivity PHR;

MAC control element for Sidelink BSR, with exception of Sidelink BSR included for padding;

data from any Logical Channel, except data from UL-CCCH;

MAC control element for BSR included for padding;

MAC control element for Sidelink BSR included for padding.

When the MAC entity is requested to transmit multiple MAC PDUs in one TTI, steps 1 to 3 and the associated rules may be applied either to each grant independently or to the sum of the capacities of the grants. Also the order in which the grants are processed is left up to UE implementation. It is up to the UE implementation to decide in which MAC PDU a MAC control element is included when MAC entity is requested to transmit multiple MAC PDUs in one TTI. When the UE is requested to generate MAC PDU(s) in two MAC entities in one TTI, it is up to UE implementation in which order the grants are processed.

Wearable devices such as smart watches are now available as a new type of user equipment on the market. As the number of wearable devices is increasing, customers' needs for those devices are growing. For instance, customers expect extremely long battery life from smart watches, like battery life of normal watches, while expecting support of various application/services including delay sensitive services e.g. voice, streaming, eHealth, like normal smart phones.

Wearable devices on the market support Bluetooth and WLAN for a short range communication RAT between UEs. Considering the devices on the market, it is interesting to support the enhanced connectivity via Bluetooth or WLAN. In the meantime, Bluetooth and WLAN cannot fully support various services with different QoS. Thus, it is necessary to provide the enhanced connectivity via 3GPP sidelink.

In order to save the power of the remote UE, the relay UE may perform measurement for mobility and handover procedure on behalf of the associated remote UEs. However, since the channel quality of the remote UE and the relay UE could different, the remote UE could stay in non-best ranked cell if simultaneous handover is performed without considering the Uu channel condition of the remote UE. This would result in the interference to the neighboring cell when the remote UE transmits. In other word, after reverting to normal operation mode, if the remote UE stays in new PCell which is not best ranked for remote UE, it would result in interferences to neighboring cells due to the uplink transmission of remote UE and the battery of remote UE would be severely impacted.

In order to assist the network to determine whether to perform simultaneous handover procedure for relay UE and associated remote UEs, the relay UE reports sidelink channel quality information to the network when a certain measurement is reported.

In the present invention, the following may be assumed.

The sidelink procedure is operated in serving carrier of the remote UE or in dedicated carrier for sidelink operation. The technology for sidelink operation involves LTE sidelink and UE to network relaying over non-3GPP access (e.g. using WiFi/Bluetooth).

The relay UE is UE to UE relay as well as UE to network relay.

The sidelink refers to the link between relay UE and remote UE.

The remote UE is currently connected to the network via relay UE.

The measurement result may be SD-RSRP/RSRQ, RSSI, SINR and/or RSRP/Q. Other measurement result can be also used. In case of relaying over non-3GPP RAT, the measurement could be performed for the beacon or data part.

When the remote UE is connected to the network via relay UE, the remote UE may not perform neighboring cell measurement or trigger measurement reporting.

Figure 6:
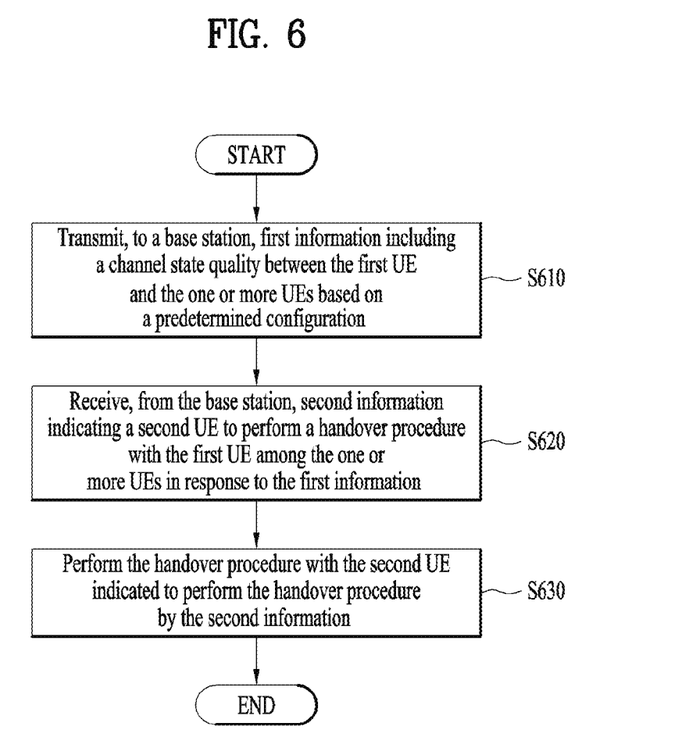
FIG. 6 is a diagram for performing a handover procedure according to an embodiment of the present invention.

FIG. 6 is a diagram for performing a handover procedure according to an embodiment of the present invention.

Referring to FIG. 6, the first UE may transmit first information including a channel state quality between the first UE and the one or more UEs based on a predetermined configuration to a base station (S610).

For example, the network may provide the indication in measurement configuration to the first UE. The indication may indicate whether the first UE is required to report sidelink channel quality information to the network when a measurement reporting for Uu interface is triggered. At this, the first UE may be a relay UE and the one or more UEs may be the remote UE. In addition, the one or more UEs may be radio resource control (RRC) connected UEs.

The indication may be included in reporting configuration (e.g. ReportConfigEUTRA). The indication is configured for each reporting configuration. For instance, the network includes the above indication in specific reporting configuration relevant for handover such as Event A3, Event A4, Event A5 measurement report triggering configurations defined in 3GPP TS 36.331. And, the indication may be configured for each connected UE. Then the above configuration includes the UE identity of the connected UEs.

If the above indication is included in measurement configuration, the first UE may measure the sidelink channel quality between the first UE and all the connected UEs (e.g. remote UEs). The channel state quality may be SD-RSRP/RSRQ, RSSI, SINR and/or RSRP/RSRQ of the sidelink. In this invention, other channel measurement result for sidelink is not excluded.

As an acquiring the channel state quality, the first UE may measure the sidelink. In addition, first UE may receive the channel state quality from the other connected UEs (e.g. remote UEs) instead of measuring sidelink channel quality by the first UE itself.

After the channel state quality is obtained, the first UE may transmit the information including the channel state quality. The information including the channel state quality may be transmitted with a measurement report for a channel between the first UE and the base station. In addition, the measurement report may be transmitted according to the Event A3, Event A4, Event A5 measurement report triggering configurations. For example, if the Event A3 is triggered, the measurement report may be transmitted.

The information for channel state quality may include an identity of the connected UE and measurement result.

For an example, if the channel state quality of some connected UEs is not available to the first UE, the first UE may report only available channel state quality. Alternatively, if the channel state quality of some connected UEs is not available to the first UE, the first UE may report null values for the connected UE for which the channel state quality is not available. For another example, if the measurement results of Uu interface (downlink) of some connected UEs are available to the first UE, the first UE also includes the available measurement results of Uu interface of connected UEs. A detailed description thereof will be described later with reference to FIG. 7.

In response to the first information, the first UE may receive second information indicating a second UE to perform a handover procedure with the first UE among the one or more UEs from the base station (S620).

After receiving the first information, the network may determine whether handover procedure is performed for the first UE and the other connected UEs. If channel state quality between the first UE and each connected remote UE is better than a certain level, the network may handover the connected UE (e.g. second UE) which has channel state quality better than a certain level as well as the first UE simultaneously. For this, the network may transmit the information indicating a second UE to perform a handover procedure with the first UE among the one or more UEs in response to the first information.

On the other hand, other UEs which has channel state quality less than a certain level would not be moved to other cell. In other word, the first UE may release a connection between the first UE and another UE not indicated to perform a handover procedure with the first UE by the information among the connected UEs.

For example, remote UE1 and remote UE2 may be connected with relay UE3. In other words, UE1 and UE2 are served by the network via UE3. In this example, it may be assumed that the channel state quality between UE1 and the UE3 is bad (e.g. SD-RSRP<threshold) meanwhile the channel state quality between UE2 and UE3 is good (e.g. SD-RSRP>threshold). In this case, a Cell1 (e.g. serving cell) may configure measurement configuration of Event A3 and Event A1 reporting configuration. The Event A3 configuration may include the indication which indicates that the UE3 is required to report channel state quality.

After receiving the measurement configuration, the UE3 may try to acquire the channel state quality of sidelink between the UE1 and the UE3 and of sidelink between the UE2 and the U3. If Event A3 is triggered in the UE3, the UE3 may report acquired channel state quality regarding the UE1 and the UE2 with corresponding UE identity. (e.g. (UE1, SD-RSRP1) and (UE2, SD-RSRP2)).

As a result of reporting channel state quality, Cell1 may decide to continue the connection between UE2 and UE3 and both UEs are handover to Cell2 (e.g. target cell). On the contrary, Cell1 may decide to disconnect UE1 from UE3 and keep the UE1 in Cell1. Alternatively, the network decides that the UE1 is still connected to UE3 and stays in Cell1. In other word, the Cell1 may transmit second information indicating the UE2 to perform a handover procedure with the UE1.

According to the second information, the first UE may perform the handover procedure with the second UE indicated to perform the handover procedure by the second information (S630).

For example, the first UE may receive a configuration for handover procedure for the first UE and the second UE from the cell1. The first UE may perform the handover to the cell2 using the received configuration. In addition, the first UE may transmit the configuration for the second UE to the second UE. According to the configuration, the second UE may assume that the serving cell is the cell2. Then, if the second UE need to make a connection with the network without the first UE, the second UE may establish a connection with cell2 using the stored configuration.

Figure 7:
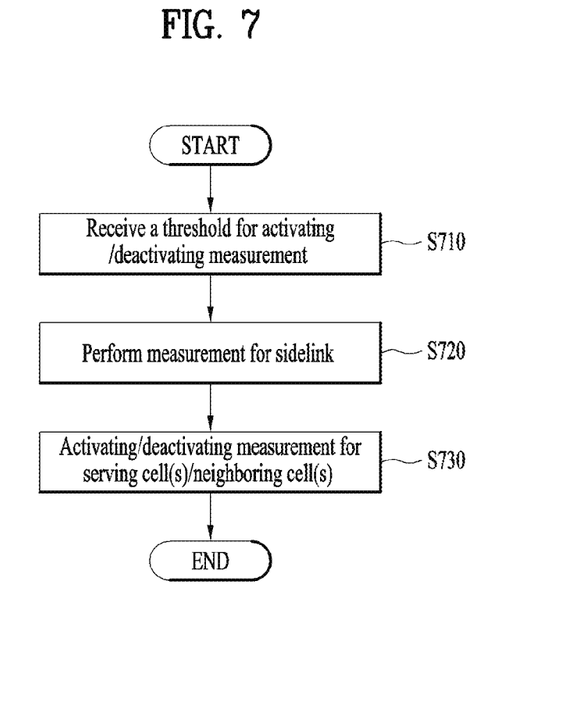
FIG. 7 is a diagram for activating a measurement according to an embodiment of the present invention

FIG. 7 is a diagram for activating a measurement according to an embodiment of the present invention.

As described above, the remote UE connected with the relay UE may measure a channel state between the relay UE and remote UE. In addition, the remote UE may measure a channel state between the serving cell(s)/neighboring cell(s) and remote UE.

Referring to FIG. 7, the remote UE may receive threshold for activating or deactivating the measurement (S710). For example, the threshold values for activating and deactivating can be different or one single value can be used for activating/deactivating measurement. Additionally, hysteresis values may be provided, which are used with threshold values. The threshold value may be provided by the network via broadcast/dedicated signalling. In addition, the remote UE may receive a measurement configuration (e.g. measurement object, identity, reporting, gap configuration).

Subsequently, the remote UE may perform measurement for sidelink (S720). In other word, the remote UE may measure a channel state quality between the relay UE and the remote UE.

According to the measure result, the remote UE may activate or deactivate the measurement for the serving/neighboring cell(s) (S730). For example, if the measured result of sidelink of the remote UE is above the threshold1 (or threshold1+hysteresis), the remote UE may not perform measurement for the channel between the remote UE and serving/neighboring cell(s). Even the measurement is deactivated, the remote UE perform measurement on the carrier only for the sidelink. Alternatively, only measurement reporting of the remote UE is deactivated. This means that the remote UE still performs measurement.

On the other hand, if the measured result of sidelink of the remote UE is less than threshold2 (or threshold 2–hysteresis), the remote UE continues to perform measurement for the channel between the remote UE and serving/neighboring cell(s) if the UE was performing measurement. And, If the condition in this step is satisfied, the remote UE may (re)initiate measurement if the measurement was deactivated. Alternatively, if the condition is met, measurement reporting may be reinitiated. If the periodic/event triggered measurement reporting is triggered, the remote UE may report the measured results.

Alternatively, the network may determine whether to activate or deactivate the measurement. For example, if the measured result of sidelink of the remote UE is above the threshold1 (or threshold1+hysteresis), the remote UE may send information on requesting the deactivation of measurement. The information includes the measured result of sidelink and the relay UE identity. On the other hand, if the measured result of sidelink of the remote UE is less than threshold2 (or threshold 2–hysteresis), the remote may UE send information on requesting the activation of measurement if the configured measurement is deactivated. After receiving the information, the network may provide command indicating deactivation and activation of measurement respectively.

As another example, the remote UE may activating/deactivating measurement based on sidelink measurement and serving cell. For example, based on the measured result of sidelink and serving cell, the remote UE may determine whether to perform measurement for neighboring cells. The neighboring cell includes intra-frequency/inter-frequency/inter-PLMN/inter-RAT neighbouring cell(s).

For this, the remote UE may receive thresholds for (de)activating measurement. The threshold values for activating and deactivating may be different or one single value may be used for activating/deactivating measurement. Additionally, hysteresis values can be provided, which are used with threshold values. The threshold value is provided by the network via broadcast/dedicated signalling. One (set) of thresholds is for measured results of sidelink and another (set) of thresholds is for measured results of serving cell. In addition, the remote UE may receive measurement configuration (e.g. measurement object, identity, reporting, gap configuration).

Then, the remote UE may perform measurement for sidelink and serving cell. If the measured result of sidelink and serving cell of the remote UE is above the threshold1 (or threshold1+hysteresis) and threshold2 (or threshold2+hysteresis) respectively, the remote UE may not perform measurement for a channel between the neighboring cell and the remote UE. Even the measurement is deactivated, the remote UE perform measurement on the carrier for sidelink. Alternatively, if the condition in this step is met, only measurement reporting of the remote UE may be deactivated. This means that the remote UE still performs measurement.

On the other hand, if the measured result of sidelink of the remote UE is less than threshold3 (or threshold3−hysteresis) or the measured result of serving cell of the remote UE is less than threshold4 (or threshold4−hysteresis), the remote UE continues to perform measurement for a channel between the neighboring cell and the remote UE if the UE was performing measurement. If the condition in this step is satisfied, the remote UE may (re)initiate measurement if the measurement was deactivated. Alternatively, if the condition in this step is met, measurement reporting may be reinitiated. If the periodic/event triggered measurement reporting is triggered, the remote UE may report the measured results.

As another example, the activating and deactivating are determined based on network control. For example, if the measured result of sidelink and serving cell of the remote UE is above the threshold1 (or threshold1+hysteresis) and threshold2 (or threshold2+hysteresis) respectively, the remote UE may send information on requesting the deactivation of measurement. The information may include the measured result of sidelink and the relay UE identity. On the other hand, if the measured result of sidelink of the remote UE is less than threshold2 (or threshold 2−hysteresis) or the measured result of serving cell of the remote UE is less than threshold4 (or threshold4−hysteresis), the remote UE may send information on requesting the activation of measurement if the configured measurement is deactivated. After receiving the information, the network may provide command indicating deactivation and activation of measurement respectively.

FIG. 8 is a block diagram of a communication apparatus according to an embodiment of the present invention.

The apparatus shown in FIG. 8 can be a user equipment (UE) and/or eNB adapted to perform the above mechanism, but it can be any apparatus for performing the same operation.

As shown in FIG. 8, the apparatus may comprise a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 8 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 8 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. The processor (110) is configured to perform operations according to the embodiment of the present invention exemplarily described with reference to the accompanying drawings. In particular, the detailed operations of the processor (110) can refer to the contents described with reference to FIGS. 1 to 7.

The embodiments of the present invention described herein below are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from essential characteristics of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

What is claimed is:

1. A method for performing, by a relay user equipment (UE) connected with a first remote UE and a second remote UE, a handover procedure in a wireless communication system, the method comprising:
receiving, from a serving cell by the relay UE, first information for whether the relay UE is required to report a first sidelink channel quality between the relay UE and the first remote UE, and a second sidelink channel quality between the relay UE and the second remote UE;
measuring, by the relay UE, the first sidelink channel quality and the second sidelink channel quality based on the received first information;
in response to the measured first sidelink channel quality being better than a predetermined threshold, measuring, by the relay UE on behalf of the first remote UE, a channel between the first remote UE and the serving cell, and a channel between the first remote UE and a neighboring cell, to prepare a first measurement report;
in response to the measured second sidelink channel quality being less than the predetermined threshold, receiving, from the second remote UE by the relay UE, a second measurement report regarding a channel between the second remote UE and the serving cell, and a channel between the second remote UE and the neighboring cell,
wherein, in response to the measured first sidelink channel quality being better than the predetermined threshold, the relay UE does not receive, from the first remote UE, a measurement report regarding the channel between the first remote UE and the serving cell, and the channel between the first remote UE and the neighboring cell;
transmitting, to the serving cell by the relay UE, second information including the measured first sidelink channel quality, the prepared first measurement report, an identity of the first remote UE, the measured second sidelink channel quality, the received second measurement report, and an identity of the second remote UE;
receiving, from the serving cell by the relay UE, third information indicating that the relay UE is to perform a handover to the neighboring cell simultaneous with a handover of the first remote UE to the neighboring cell, in response to the measured first sidelink channel quality being better than a certain level,
wherein the third information lacks indication that the relay UE is to perform the handover to the neighboring cell simultaneous with a handover of the second remote UE to the neighboring cell, in response to the measured second sidelink channel quality being less than the certain level;
based on the received third information, performing, by the relay UE, the handover to the neighboring cell simultaneous with the handover of the first remote UE to the neighboring cell, and without handover of the second remote UE to the neighboring cell; and
based on the received third information, releasing a connection between the relay UE and the second remote UE.

2. The method of claim 1, wherein the first remote UE and the second remote UE are radio resource control (RRC) connected UEs.

3. A relay user equipment (UE) connected with a first remote UE and a second remote UE in a wireless communication system, the relay UE comprising:
a radio frequency (RF) module; and
a processor connected with the RF module, wherein the processor is configured to:
control the RF module to receive, from a serving cell, first information for whether the relay UE is required to report a first sidelink channel quality between the relay UE and the first remote UE, and a second sidelink channel quality between the relay UE and the second remote UE;
measure the first sidelink channel quality and the second sidelink channel quality based on the received first information;
in response to the measured first sidelink channel quality being better than a predetermined threshold, measure, on behalf of the first remote UE, a channel between the first remote UE and the serving cell, and a channel between the first remote UE and a neighboring cell, to prepare a first measurement report;
in response to the measured second sidelink channel quality being less than the predetermined threshold, control the RF module to receive, from the second remote UE, a second measurement report regarding a channel between the second remote UE and the serving cell, and a channel between the second remote UE and the neighboring cell,
wherein, in response to the measured first sidelink channel quality being better than the predetermined threshold, the relay UE does not receive, from the first remote UE, a measurement report regarding the channel between the first remote UE and the serving cell, and the channel between the first remote UE and the neighboring cell;
control the RF module to transmit, to the serving cell, second information including the measured first sidelink channel quality, the prepared first measurement report, an identity of the first remote UE, the measured second sidelink channel quality, the received second measurement report, and an identity of the second remote UE;
control the RF module to receive, from the serving cell, third information indicating that the relay UE is to perform a handover to the neighboring cell simultaneous with a handover of the first remote UE to the neighboring cell, in response to the measured first sidelink channel quality being better than a certain level,
wherein the third information lacks indication that the relay UE is to perform the handover to the neighboring cell simultaneous with a handover of the second remote UE to the neighboring cell, in response to the measured second sidelink channel quality being less than the certain level;
based on the received third information, perform the handover to the neighboring cell simultaneous with the handover of the first remote UE to the neighboring cell, and without handover of the second remote UE to the neighboring cell; and
based on the received third information, release a connection between the relay UE and the second remote UE.

4. The relay UE of claim 3, wherein the first remote UE and the second remote UE are radio resource control (RRC) connected UEs.

* * * * *